United States Patent [19]
MacDonald

[11] Patent Number: 5,355,411
[45] Date of Patent: Oct. 11, 1994

[54] DOCUMENT SECURITY SYSTEM

[76] Inventor: John L. MacDonald, 44 Swanston Avenue, Inverness IV3 6QW, Scotland

[21] Appl. No.: 969,162
[22] PCT Filed: Aug. 14, 1991
[86] PCT No.: PCT/GB91/01385
§ 371 Date: Feb. 11, 1993
§ 102(e) Date: Feb. 11, 1993
[87] PCT Pub. No.: WO92/03804
PCT Pub. Date: Mar. 5, 1992

[30] Foreign Application Priority Data

Aug. 14, 1990 [GB] United Kingdom ............... 9017774.2
Sep. 7, 1990 [GB] United Kingdom ............... 9019554.7

[51] Int. Cl.⁵ .......................... H04L 7/32; G06K 9/00
[52] U.S. Cl. .......................................... 380/23; 382/3; 380/24; 380/25
[58] Field of Search .................. 380/23, 51, 54, 55, 380/24, 25; 382/1-4

[56] References Cited

U.S. PATENT DOCUMENTS

| | | | |
|---|---|---|---|
| 4,138,058 | 2/1979 | Atalla | 380/23 |
| 4,504,084 | 5/1985 | Jauch | 380/54 |
| 4,785,290 | 11/1988 | Goldman | 380/54 |
| 4,807,287 | 2/1989 | Tucker et al. | 380/23 |
| 4,972,476 | 11/1990 | Nathans | 380/23 |
| 4,993,068 | 2/1991 | Piosenka et al. | 380/23 |
| 5,027,401 | 6/1991 | Soltesz | 380/54 |
| 5,030,219 | 9/1991 | Maury | 382/3 |
| 5,054,088 | 10/1991 | Gunderson et al. | 382/3 |
| 5,091,975 | 2/1992 | Berger et al. | 382/3 |
| 5,157,726 | 10/1992 | Merkle et al. | 380/23 |
| 5,195,133 | 3/1993 | Kapp et al. | 382/3 |
| 5,227,614 | 7/1993 | Danielson et al. | 382/1 |
| 5,241,600 | 8/1993 | Hillis | 380/25 |
| 5,251,265 | 10/1993 | Dohle et al. | 382/3 |
| 5,285,506 | 2/1994 | Crooks et al. | 382/3 |
| 5,297,302 | 3/1994 | Kapp et al. | 380/23 |

FOREIGN PATENT DOCUMENTS

| | | |
|---|---|---|
| 0334616 | 9/1989 | European Pat. Off. . |
| 2449930 | 9/1980 | France . |
| 2592197 | 6/1987 | France . |
| 8204149 | 11/1982 | PCT Int'l Appl. . |
| 8703724 | 6/1987 | PCT Int'l Appl. . |
| 8900741 | 1/1989 | PCT Int'l Appl. . |

OTHER PUBLICATIONS

IBM Corp., IBM Technical Disclosure Bulletin, Dec. 1988, vol. 31, No. 7, pp. 441 and 442.
IBM Technical Disclosure Bulletin, "Facial Image Data On Credit Card For Identification", Jan. 1988, vol. 30, No. 8, p. 366.

Primary Examiner—Salvatore Cangialosi
Attorney, Agent, or Firm—Greg T. Sueoka

[57] ABSTRACT

A document security system is described for encoding documents such as credit cards, chargecards and the like with a unique signal representative of the user which cannot be read by the unaided eye and can only be read using a document reading means such as a card swipe machine. In a preferred arrangement the signature of a user is digitized by a digital scanner and compressed and magnetically encoded onto the magnetic stripe of the credit card. The user's portrait can also be digitized and printed on the anti-tamper panel on the card. In use, the user presents the card in a bank or store and the portrait is initially compared with user and assuming there is a likeness, the card is swiped through a card swipe reader and the encoded signature is read and displayed on a LCD-type display. The vendor or teller at the point of use can compare the signature read from the card with the user's actual signature to verify the authenticity of the user. Embodiments of the invention and a novel digital compression technique are described.

12 Claims, 4 Drawing Sheets

DOCUMENT SECURITY SYSTEM

BACKGROUND OF THE INVENTION

The present invention relates to a document security system and apparatus for encoding documents such as cheque cards and credit cards with information to ensure that the documentation can be verified as authentic to prevent document fraud and the like. This invention is particularly, but not exclusively, intended to minimise cheque, cheque card and credit card fraud.

It is well known that document fraud, such as credit card fraud, costs several million pounds per annum both to the owners of the documents such as banks, and also to the customers. In addition, there is considerable police and court time devoted to the pursuit, apprehension and punishment of persons involved in the carrying out of such frauds.

SUMMARY OF THE INVENTION

An object of the present invention is to provide a document security system and apparatus which obviates or mitigates the above mentioned problem.

This is achieved by storing the signature of a user on the document, in a form which cannot be read by the unaided human eye and providing reading means for reading the stored signal so that the stored signal can be compared with a sample signature.

In a preferred arrangement, the portrait and signature of the user are both provided on the document, for example, a cheque card or credit card, and the signature is encoded on the card so that the signature cannot be read if the document falls into unauthorised hands. However, the encoded signature may be read at the point of use by a reading machine and compared with a stored signature or by direct comparison with the presenter's signature to verify the authenticity of the user.

The user's signature is electronically read and compressed and is stored on a magnetic strip on the document, when the magnetic strip is read at the point of use, the user's signature is displayed on a screen to enable the vendor to compare it with the actual signature of the user to enable verification of the user.

The encoded signal may be optically encoded and consequently can be optically read.

According to one aspect of the present invention there is provided a security system for encoding documents with a signature representative of a user, said security system comprising: signal recording means for reading a sample signature and for digitally encoding said sample signature so that said sample signature cannot be read directly by the unaided eye; digital data compression means coupled to said signal recording means for compressing the digitally encoded signature to a reduced amount of data of 160 bytes or less, said digital data compression means including, means for setting the desired usage size of the signature and means for setting the level of digital data to fit into said desired signature size, scanning means for scanning said signature on a line by line basis, means for determining and removing multiple dots from said scanned image and storage means for storing a number of dots and a number of dot displacements, counting and storage means for counting and storing increment values and the number and position of tray dots, comparison means for comparing the total dot count in said compressed digitised signature with said digital data level, and scaling means for scaling the image size of the signature by the target or dot count in vertical and horizontal scales;

recording means for magnetically recording the compressed digitised signature on a magnetic stripe of a document; signal reading means including magnetic stripe reading means including magnetic stripe reading means for reading a compressed signature so stored on a magnetic stripe; and display means coupled to the signal reading means for visually displaying the compressed signature so that a visual comparison between the compressed signature and a further sample signature provided by a user may be made to verify the identity of the user.

Conveniently, the signal recording means includes a digital scanner for digitising said signal and a computer coupled to said digital scanner for receiving and storing said digitised signal.

Preferably said magnetic stripe reading means is a card-swipe machine and said displays means is a LCD visual display for displaying the signal read from the document swiped through said card-swipe machine.

Conveniently, the portrait of the user is recorded by said signal recording means and digitised, and printing means are coupled to said computer for receiving said digitised portrait data and printing the portrait of said user on the document as well as the encoded signal to provide a further level of document security. Preferably, the signature data is digitally compressed on said stripe.

According to a second aspect of the invention there is provided a method of storing an encoded signal representative of the signature of a user onto a magnetic stripe on a document, the method comprising the steps of:

digitizing the user's signature;

compressing the digitised signature to 160 bytes or less by setting the desired image size of the signature, and setting the level of digital data to fit into said desired signature size;

scanning the digitised signature line by line;

on the first scan line removing multiple dots and storing a number of dots and a number of dot displacements;

on the second and subsequent scan lines for each stored dot on the previous line counting and storing increment values, and counting and storing the number and position of stray dots;

comparing the total dot count in the compressed digital data with the digital data level;

scaling the image size of the signature by the dot count in the vertical and horizontal directions;

repeating the method steps until the compressed digital data is less than said desired level; and magnetically recording the compressed signature onto the document so that it cannot be read directly by the unaided eye.

According to yet a further aspect of the invention there is provided a method of verifying the authenticity of the user of a document comprising, storing a compressed signature on the document as set out in the above second aspect, reading the compressed signature from the document with a reading means, and displaying visually the read signature so that the read signature can be compared visually with a sample signature provided by the presenter or user of the document to allow verification of the authenticity of the user.

According to a further aspect of the present invention there is provided a method of compressing a digitised image of a signature comprising the steps of, setting the desired image size of the signature, setting the level of digital data to fit into said desirbed signature size;

scanning the digital image of the signature line by line, on the first scan line removing multiple dots and storing a number of dots and a number of dot displacements;

on the second and subsequent scan lines for each stored dot on the previous line counting and storing increment values, and counting and storing the number and position of stray dots, comparing the total dot count in the compressed digital data with the digital data level, scaling the image size of the signature by the target/-dot count in the vertical and horizontal scales, repeating the method steps until the compressed digital data is less than the desired level.

Conveniently, the system includes a plurality of document reading means and display means disposed at remote locations, each document reading means and display means being a stand alone retrieval means for reading the digitised signal from the document and displaying the retrieval signal.

Conveniently also, each of said plurality of reading and display means are coupled to a central controller whereby the read signal can be electronically compared with a stored signal and both the stored and electronically read signals displayed for a visual comparison.

The image or signature is encoded in optically or magnetically format onto the document and may be read using a magnetic scanner or an optical scanner.

DETAILED DESCRIPTION OF THE PREFERRED EMBODIMENTS

Figure 1:
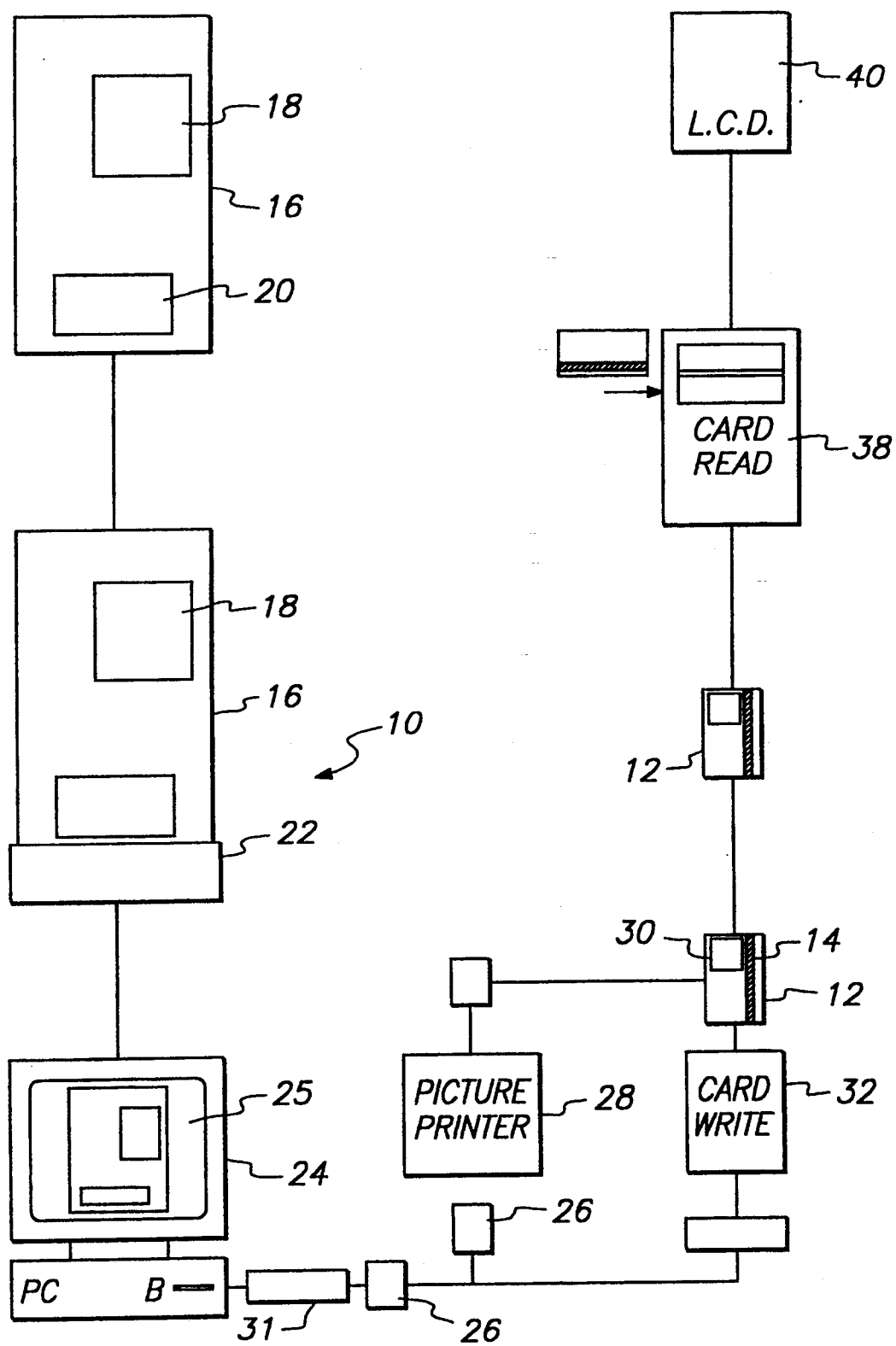
FIG. 1 is a schematic diagram of an embodiment of document security system in accordance with present invention.

Reference is first made to FIG. 1 of the drawings which depicts a document security system, generally indicated by reference numeral 10, for incorporating a portrait of the user onto the point of a credit card 12 and the user's signature, invisible to the human eye, onto the magnetic strip 14 on the reverse side of the card, best seen in FIGS. 2a, 2b, as will be later described in detail.

In the system 10, in order to create a secure card 12 a user who wishes such a card completes an application form 16 by including a self-portrait 18 such as a passport-type photograph and also his signature 20. The completed application form 16 is fed into a flatbed image scanner 22 (type M3094 E/P, Fujitsu Limited) which digitises the image data at a fast scanning rate of 200 dots (pixels)/inch resolution in line-art format. The portrait 18 is digitised using grey scale or colour. The digitised data is fed to a personal computer 24 (Apple MacIntosh) which displays the digitised signature on the screen 25. In this format there is far too much data, perhaps 8–20K bytes of data in the signature alone, for it to be recorded onto magnetic card strip.

The digitised portrait information 26 is fed to a picture printer 28 for printing the users portrait on a anti-tamper panel 30 on the front of the credit card 12. The signature 20 is compressed into 160 bytes or less of information as will be later described and the compressed signature data 31 is fed to a magnetic card write machine 32 which writes the compressed data onto certain available tracks on the magnetic strip 14. In the present case the data is written onto 2 tracks, track 0 and track 4, but this may be varied depending on the particular application. The standard credit card is 3.375" wide and the magnetic strip 14 is the same width. Thus, the data is compressed to fit the magnetic strip width so that for each track there are approximately 200 bits per inch; this is why two tracks are needed to hold 160 bytes of compressed data. It will be appreciated that one byte of the 160 bytes is used as a check sum byte to ensure that data is correctly written to the card or document.

Figure 2A:
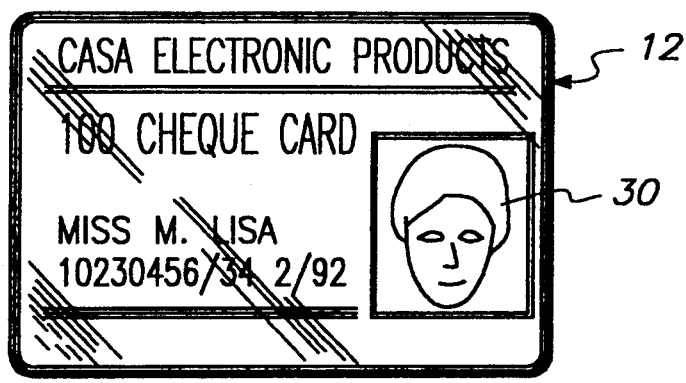
FIGS. 2a, 2b depict a credit card in accordance with an embodiment of the present invention with the users portrait on the front and the magnetic stripe with the encoded signature on the back.
Figure 2B:
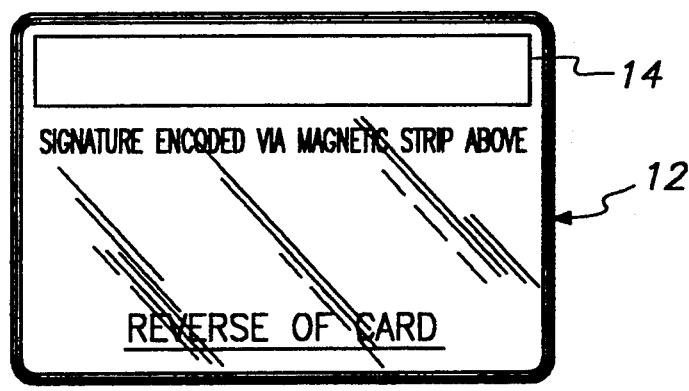
Figure 3:
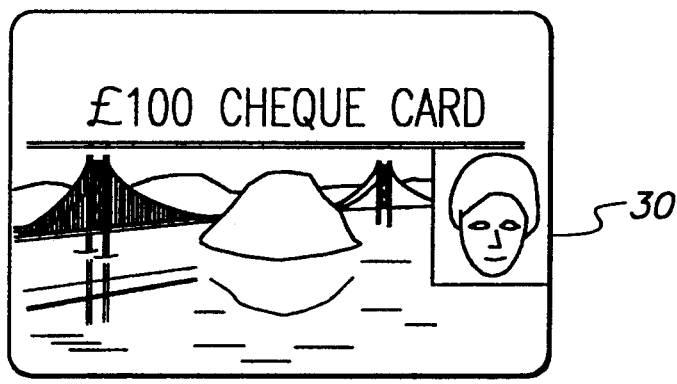
FIG. 3 is a diagrammatic example of a credit card printed with a portrait of a user and which carries a magnetically encoded signature using the system of FIG. 1.
Figure 4:
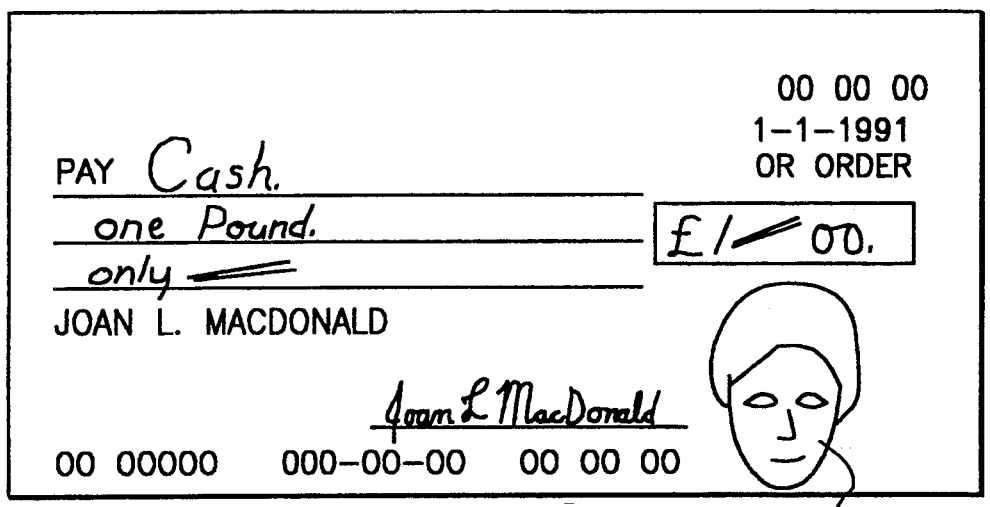
FIG. 4 depicts a cheque card overprinted with a portrait of a user using the system of FIG. 1.

Thus, the security coded credit card 12 contains the users portrait 18 on a tamper-proof panel 30 and the users signature electronically compressed and stored magnetically on tracks 0 and 4 of the magnetic strip 14 as seen in FIGS. 2a, 2b and FIG. 3. Similarly, the portrait 18 without the signature may be printed onto personal cheques as shown in FIG. 4.

In order to use the card and ensure that the user is authentic, the card is presented to a point of sale position, e.g. the teller in a bank. The teller takes the card and firstly views the card portrait and compares it with the user before him. The card is then passed through a card reader such as a card swipe machine 38 which has a small LCD T.V. type display 40 coupled thereto. The card read-write machine is not ISO standard having been modified by the addition of switches and firmware inside so that 8 bits can be written to any of the tracks. The users compressed signature is firstly decoded from the tracks and displayed to the teller only on the LCD T.V. type display 40. When the user signs a cheque or other document the teller then compares his actual signature with the card-stored signature and, if satisfied as to the authenticity of the vendor, permits the transaction to be completed. Should the signatures be sufficiently different to cause doubt as to the user's authenticity the vendor may terminate the transaction.

Thus, it will be appreciated that because the signature is invisible to the human eye it cannot be forged and the chances of a fraudulent user being able to sign a duplicate signature to the card-stored signature is negligible. The provision of the users portrait on the credit card further enhances security.

A further level of security may be provided by encoding the digitised portrait or signature to form a scrambled signal and to print the scrambled signal on the cheque, cheque card or other document. At the time of use, the user signs the cheque in the usual way. The scrambled signature cannot be read except by the teller who can "read" the scrambled code with a machine having a decryption algorithm. The teller is thus able to compare the scrambled signal, representative of portrait or signature, with the stored information. This means that the teller has access to a device either retrieving the unscrambled data from master storage unit or for reading the scrambled information on the document and descrambling it so that a comparison can be made at the point of use.

As described above, a particularly convenient solution to the problem is achieved by printing an unscrambled portrait of the user on the document or card as show on FIGS. 2, 3 and 4 for ease of immediate comparison and also providing an unscrambled signal representative of the signature of the user on the card. With existing technology, this comparison can be readily effected in most stores or businesses where document verification is required.

The personal computer 24 and card reader 38 may be connected by a suitable network or other suitable link to a distributed group of computers or terminals which have access to the stored information.

Figure 5:
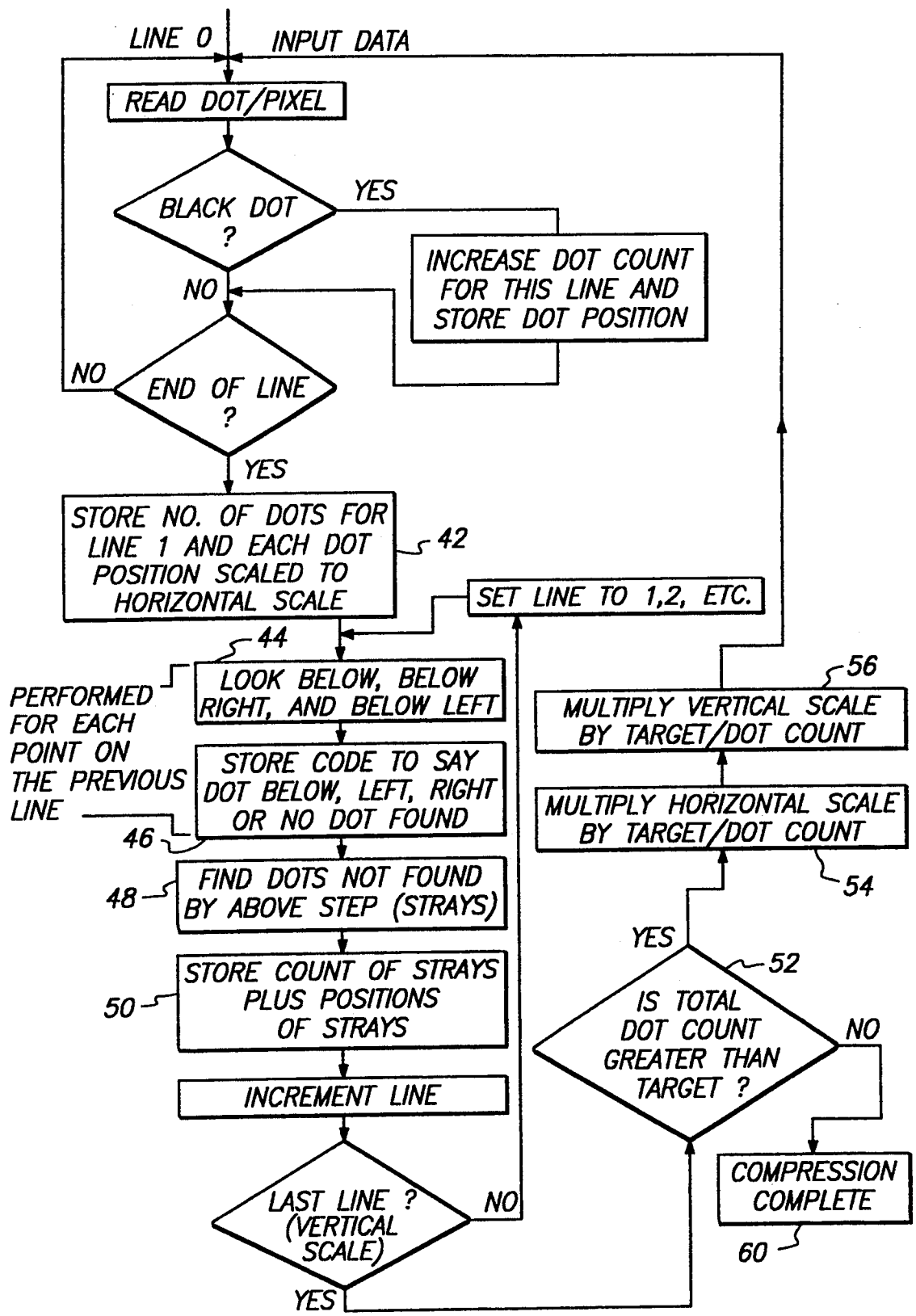
FIG. 5 is a flow chart of a compression algorithm used with the system of FIG. 1 to compress and store signature data on the magnetic strip of a credit card.

Reference is now made to FIG. 5 of the drawings which depicts a flow chart of the compression technique used with the system of FIG. 1 to compress the data digitised by the flatbed image scanner 22 to a sufficiently small number of bytes, in our case 160 bytes, to fit onto 2 tracks of the magnetic strip 14 on the credit card 12, but which, when read, will display clearly a legible facsimile of the actual signature of the user. In practice, the compression technique has to reduce the scanned 200 dots/inch image occupying 8–20K bytes of file space to 160 bytes. The technique parameters could be raised to accommodate higher byte capacities to suit tracks being developed with higher bit densities, for example, 420 BPI instead of 210 BPI. Alternatively, an additional track may be added to the magnetic strip 14 to receive compressed data.

The encoding of magnetic strip is well established and is not disclosed here. Reference is made to an article in Auto ID Today by Sjoerd P. Wouda entitled Magnetic Strip Technology (Vol. 7, June 1989). Because space on each track is limited the compressed data is stored in bit fields which do not fall necessarily on bit boundaries. For example, a 5-bit field could be stored as 3 bits in one byte and 2 bits in the next byte so that no bits are wasted.

Compression of the scanned data is achieved by using the fact that the raster scanned image data is stored as a number of lines of dots. The stored data is first processed, one line at a time, to remove multiple dots which are next to each other as some of these are redundant. For example, a typical pen width at 200 dots/inch scanning results up to 15 to 20 bits in the scanned image and these "multiples" are removed. In addition, the compression technique makes use of the fact that the data in a scanned signature is not random. For example, in a scanned signature if a dot is encountered in one line, then it is likely that a dot will be found on the next line either directly below or slightly to the right or left. This is resolved down to four possibilities; a dot below, a dot one space left, a dot one space right or none of these and these four possibilities are represented by 2 bits.

Referring to FIG. 5, when starting with the first line (line 0) in the image there is a bit field 42 to store a number of points, then a number of bit fields which give the distance to the first point, the distance from the last point to the current point etc. By using the increments algorithm there will be as many increments on the next line (line 1) as points on line so that there is no need for any increment count. Line 1 is therefore scanned 44 for increments and store 46, and then re-scanned 48 to detect any points, called strays, which are not picked-up as increments, and then a further line is encoded in the same format as line 1 with a dot count field plus as many dot displacement fields 50. Thus, line 1 is stored as a dot count plus a bit of dot displacements one line 2 and subsequent lines are stored as a number of increments, each increment being encoded on 2 bits, with the number of increments being the same as the number of dots on the previous line; plus the number of strays and the displacements of those strays.

It is desired to reduce the data to 160 bytes, i.e. 1280 bits and the actual scanned image may contain perhaps 2–300 lines and 6–800 columns. In practice best results have been obtained when this image is scaled down to a maximum of 63 lines by 127 columns. Vertical and horizontal scales are first picked (FIG. 4) which match these values and then the image is scanned and compressed. The number of bits in the scanned image is then compared 52 with the target, i.e. 1280 bits in this example. If the number of compressed image bits is greater than the target number of bits, then the number of horizontal and vertical scan lines is scaled down by the number of allowable (target) bits to actual bits 54, 56 (target/dot count $_{HOR}$; target/dot count $_{VERT}$) so that the target number of bits is obtained in two or three iterations. If the number of compressed image bits is less than the target number, the compression is complete.

The technique contains several optimisation features, one of which is that the bit fields are reduced in size from the theoretical minimum to save space. For example, because more than 15 strays are rarely encountered on one line, the count of strays is encoded on 4 bits only. If there is a stray count > 15 in the 4-bit field, 15 is put in the 4-bit field and then the next 6-bit field is used for the full stray count. Therefore, on that particular line storage capacity has been lost, but overall the technique has saved 5 to 10% of storage. The same technique is also applied to the storage of displacements on a line.

It will be understood that various modifications may be made to the embodiment herebefore described before departing from the scope of the invention. In the apparatus described, for example, a video camera could be used for taking portraits and the image scalled to provide a digitised portrait. Alternatively, a still photograph or signature could be digitised using a digitising tablet. In addition, the flatbed image scanner 22 may be used to digitise a picture of the fingerprint of a user to provide a unique signal representative of that user and this signal compressed using a similar technique described with reference to the signature. A similar compression technique may be used to compress the portrait data. The compressed data may be optically encoded onto the document and read by an optical card reader (OCR) using existing OCR technology. The photograph and/or image of the user may be located on the signature strip on a credit card and the scrambled code may be contained in a medium which can be decoded by an optical scanner or magnetic scanner.

The laser printer may be replaced by any other suitable digitally controlled printer such as an ink-jet printer or electro-static printer. In addition, it is not necessary for other remote terminals to be directly connected to a master computer which stores all the information or a stand-alone reader to compare the presenters signature with that which is encoded. The remote terminals may be connected by a modem. The information may be stored on a disc which may be sent to a remote location and inserted into an appropriate host terminal which has software to enable the comparisons of portrait and encoded signature to be made with the presenters signature. Signatures or portraits could also be faxed to remote locations from a central location to facilitate verification. It will be understood that document is a general term applicable to a variety of objects such as credit cards, smart cards, chargecards, cheques, cheque guarantee cards, files, folders, I.D. cards, security access cards and any other suitable document where it is desirable to ensure the authenticity of the user and prevent fraud.

Advantages of the present invention are that there are extra levels of security to enable verification of the user to take place and that the comparison is effected on the basis of characteristics which are believed to be unique to the user, for example, the portrait signature, fingerprint or combinations of these. Thus, the opportunity for forgery or fraud in connection with such documentation is considerably minimised. The system uses existing technology and is designed to interface with existing systems, thus it can readily be set up in existing environments without specialist expertise.

In the case of a smart card, i.e. one that has a processor and storage means, the signature and portrait could be contained in the storage means therein.

I claim:

1. A security system for encoding documents with a signature representative of a user, said security system comprising:

signal recording means for reading a sample signature and for digitally encoding said sample signature to produce a digitally encoded signature that cannot be read directly by the unaided eye;

digital data compression means coupled to said signal recording means for compressing the digitally encoded signature into a compressed signature with a reduced amount of data of 160 bytes or less, said digital data compression means including means for setting a usage size of the signature and means for setting a level of digital data to fit into said usage size, scanning means for scanning said signature on a line by line basis to produce a scanned image, means for determining and removing multiple dots from said scanned image and storage means for storing a number of dots and a number of dot displacements, counting and storage means for counting and storing increment values and a number and position of stray dots, comparison means for comparing a total dot count in said compressed digitised signature with said digital level, and scaling means for scaling the image size of the signature by a target or dot count in vertical and horizontal directions;

recording means for magnetically recording the compressed signature on a magnetic stripe of a document;

signal reading means including magnetic stripe reading means for reading a compressed signature so stored on a magnetic stripe; and display means coupled to the signal reading means for visually displaying the compressed signature so that a visual compression between the compressed signature and a further sample signature provided by a user may be made to verify the identity of the user.

2. A security system as claimed in claim 1 wherein the signal recording means includes a digital scanner for digitising said signal and a computer coupled to said digital scanner for receiving and storing said digitised signal.

3. A security system as claimed in claim 1 wherein said magnetic stripe reading means is a card-swipe machine and said display means is a LCD visual display for displaying the signal read from a document swiped through said card-swipe machine.

4. A security system as claimed in claim claim 2, including means for recording and digitizing a portrait of the user with said signal recording means and printing means coupled to said computer for receiving said digitised portrait data and printing the portrait of said user on the document as well as the compressed digitised signature to provide a further level of document security.

5. A security system as claimed in claim 1, wherein the signal recording means includes data encryption means for encrypting the sample signature prior to encoding said digital data onto said document, and said signal reading means includes data decrypting means for decrypting the encrypted signature on said document.

6. A security system as claimed in claim 4, wherein said printing means is a laser printer.

7. A security system as claimed in claim 1, wherein the said document is a credit card, cheque card or smart card.

8. A method of storing an encoded signal representative of a signature of a user onto a magnetic stripe on a document, the method comprising the steps of:

digitising the user's signature;
   compressing the digitised signature to 160 bytes or less by setting an image size of the signature, and setting a level of digital data to fit into said image size;
   scanning the digitised signature line by line;
   on the first scan line removing multiple dots and storing a number of dots and a number of dot displacements;
   on the second and subsequent scan lines, for each stored dot on the previous line, counting and storing increment values, and counting and storing the number and position of stray dots;
   comparing a total dot count in the compressed digital data with the level of digital data;
   scaling the image size of the signature by the dot count in the vertical and horizontal directions;
   repeating the method steps until the compressed digital data is less than the set level of digital data;
   and magnetically recording the compressed signature onto the document so that it cannot be read directly by the unaided eye.

9. A method of verifying the authenticity of a user of a document, comprising:

storing a compressed signature on the document as claimed in claim 8;
   reading the compressed signature from the document with a reading means; and
   displaying visually the read signature so that it can be compared visually with a sample signature provided by the presenter or user of the document to allow verification of the authenticity of the user.

10. A method of compressing a digitised image of a signature, comprising the steps of:

setting an image size of the signature, setting a level of digital data to fit into said image size;

scanning the digitised image of the signature line by line;

on a first scan line removing multiple dots and storing a number of dots and a number of dot displacements;

on a second and subsequent scan lines for each dot on the previous line counting and storing increment values, and counting and storing the number and position of stray dots;

comparing a total dot count in the compressed digitised signature with the digital data level;

scaling the image size of the signature by a target/dot count in the vertical and horizontal directions; and repeating the method steps until the compressed digital signature is less than the set level of digital data.

11. A security system as claimed in claim 4, further comprising means for containing the portrait, once printed on a document, in a tamper-proof panel.

12. A method as claimed in claim 8, wherein the compressed signature is recorded onto two tracks of a magnetic stripe.

* * * * *